United States Patent
Benco et al.

(10) Patent No.: US 7,388,882 B2
(45) Date of Patent: Jun. 17, 2008

(54) METHOD FOR DYNAMICALLY RECONFIGURING WIRELESS NETWORK CAPACITY

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 893 days.

(21) Appl. No.: 10/633,821

(22) Filed: Aug. 4, 2003

(65) Prior Publication Data

US 2005/0030890 A1 Feb. 10, 2005

(51) Int. Cl.
*H04J 3/22* (2006.01)
(52) U.S. Cl. .................. 370/468; 455/405; 455/406
(58) Field of Classification Search ............... 370/229, 370/252, 253, 328, 465, 468; 455/405, 406
See application file for complete search history.

(56) References Cited

U.S. PATENT DOCUMENTS 5,724,659 A * 3/1998 Daniel et al. ............ 455/452.2
5,828,737 A * 10/1998 Sawyer .................. 379/114.07
6,154,643 A * 11/2000 Cox ............................ 455/406
6,208,640 B1 * 3/2001 Spell et al. .................. 370/358
6,226,277 B1 5/2001 Chuah
6,307,865 B1 * 10/2001 Ogasawara et al. ......... 370/468
6,469,991 B1 10/2002 Chuah
6,567,416 B1 5/2003 Chuah
6,973,037 B1 * 12/2005 Kahveci ...................... 370/236
7,072,968 B2 * 7/2006 Mikami et al. ............. 709/229
2004/0139037 A1 * 7/2004 Paleologo ................... 705/412

* cited by examiner

*Primary Examiner*—Ricky Q. Ngo
*Assistant Examiner*—Dady Chery

(57) ABSTRACT

A method for dynamically reconfiguring wireless network capacity purchased by a service provider from a network equipment/software provider. The method includes: a) determining if a current demand for network capacity exceeds a first value, b) if the current demand exceeds the first value, reconfiguring network capacity for the wireless network to a higher purchased network capacity, c) determining if the current demand is less than a second value, and d) if the current demand is less than the second value, reconfiguring network capacity for the wireless network to a lower purchased network capacity. In another embodiment, usage data associated with a selected network capacity is accumulated and provided to the network equipment/software provider's billing system.

3 Claims, 2 Drawing Sheets

METHOD FOR DYNAMICALLY RECONFIGURING WIRELESS NETWORK CAPACITY

BACKGROUND OF INVENTION

The invention generally relates to reconfiguring wireless network capacity and, more particularly, to a method for dynamically reconfiguring wireless network capacity based on current demand and network capacity and will be described with particular reference thereto. However, it is to be appreciated that the invention is also amenable to other applications.

In a wireless network, typically, an equipment provider owns certain centralized network equipment (e.g., a mobile switching center (MSC)) and a wireless service provider provides subscribers with wireless service. In order to provide quality service to its subscribers, the wireless service provider purchases a certain level of network capacity from an equipment provider. Generally, network capacity agreements are handled through the equipment provider's customer service operation using verbal or written communications. Typically, the current network capacity identified in an agreement continues in effect until a new superceding agreement is established. This arrangement is not conducive to day-to-day or hour-to-hour fluctuations in demand for capacity. In many cases, when a wireless network is running at or near purchased capacity overload, some percentage of new incoming calls will be throttled. For example, several U.S. patents assigned to Lucent Technologies and disclosing several methods of overload control are provided below.

U.S. Pat. No. 6,226,277 to Chuah discloses a method for controlling admission of remote hosts to a base station in a wireless communications network based on usage priority. There are at least two user priority classes disclosed and the base station admits a threshold number of remote hosts of the lower priority class and a maximum total number of remote hosts. When a base station receives a connection request from a new user of the higher priority class, if the current total number of admitted users is less than the maximum allowable, the new user of class is admitted, otherwise, the base station checks to see if any lower priority class users are currently admitted and allow disconnection. If so, the base station disconnects the lower priority user and admits the new user. In one embodiment, the base station disconnects the "least recently used" admitted lower priority user that allows disconnection. If it is appropriate to disconnect lower priority users after they are admitted, then lower priority users are admitted as long as the total number of associated users is less than the maximum allowable admitted users. If it is inappropriate to disconnect lower priority users after they are admitted, then lower priority users are admitted only if the number of admitted users is less than the maximum number of total admitted users and the number of lower priority admitted users is less than the maximum allowable admitted number. This approach can be extended to multiple priority classes. In an alternate embodiment, lower priority class users are admitted if the total number of currently associated users of all classes is less than a second threshold, normally lower than the threshold for higher priority users, rather than being based partially (as a second threshold) on the number of currently associated users of that lower priority class.

U.S. Pat. No. 6,469,991 to Chuah discloses a method for overload control in a wireless communications network employing On-Demand Multiple Access Fair Queuing. If the downlink/uplink buffer occupancy of the network has exceeded a high threshold, the base station determines if this is caused by a specific remote host or by a group of remote hosts. If caused by a specific remote host, the base station normally sends a flow control signal to the remote host to prevent it from sending more data, but may alternatively elect to disconnect other remotes if the remote experiencing bad performance is of a higher priority. The base station may additionally reduce the bandwidth shares allocated to any remote that have indicated tolerance for a variable allocated bandwidth. If the measured frame error rates for many remote hosts are increasing, then the base station may elect to disconnect those remote hosts that permit service interruption in order that more bandwidth may be allocated to the remaining users. If a majority of all associated remote hosts experience high uplink frame error rates, the base station may instead send a signal to a wireless hub which can coordinate the actions of other access points. Short packets queued up for so long at the base station that they exceed the time-to-live value allocated will be thrown away. The base station may also or alternatively elect to disconnect some users of a lower priority or redirect them to other nearby base stations that have a lower load. In a particular embodiment, an uplink Frame Error Rate (FER), an average uplink bit rate, a burstiness factor of uplink traffic, and a packet loss rate are measured at the base station for each remote host. Similarly, a downlink Frame Error Rate is measured at each remote host and then each FER is sent to the base station. If an overload condition exits, connections with a Frame Error Rate that has exceeded a threshold for a specified time and that have indicated that their connections can be interrupted are disconnected. Other combinations of the possible actions are suitable, with the exact combination being determined by the base station depending on the particular congestion conditions observed in the network.

U.S. Pat. No. 6,567,416 to Chuah discloses a method for access control in a wireless network having a base station and a plurality of remote hosts. The method includes the optional abilities of making dynamic adjustments of the uplink/downlink transmission ratio, making dynamic adjustments of the total number of reservation minislots, and assigning access priorities by message content type within a single user message stream. The method further provides for remote wireless host paging and for delayed release of active channels by certain high priority users in order to provide low latency of real-time packets by avoiding the use of repeated channel setup signaling messages. In one embodiment, there are N minislots available for contention in the next uplink frame organized into a plurality of access priority classes. The base station allows m access priority classes. Each remote host of access priority class i randomly picks one contention minislot and transmits an access request, the contention minislot picked being in a range from 1 to $N_i$ where $N_{(i+1)} < N_i$ and $N_1 = N$. In an alternate embodiment of a method for access control, each remote host of access priority class i and with a stack level that equals 0, then transmits an access request with a probability $P_i$ where $P_{(i+1)} < P_i$ and $P_1 = 1$.

U.S. Pat. No. 6,577,871 to Budka et al. discloses a wireless communications service where the service area is divided into multiple cells. A common workstation (COWS) is connected to multiple cell workstations (CEWSs) in hierarchial relation to realize the service. The COWS performs call processing and other tasks common to all cells served by the CEWSs. The latter perform call setups, paging message distributions, and other cell specific operations. First and second central processing unit (CPU) overload control routines are run on the COWS and each CEWS, respectively, to manage their CPU loads. Specifically, different defense actions may be applied by the first and second routines to alleviate the CPU loads of the COWS and CEWS, respectively. These defense actions include COWS's dropping a fraction of paging messages to be processed thereby, and CEWS's dropping a fraction of paging messages, short message service (SMS) broadcast messages and radio frequency (RF) signal strength messages to be processed thereby. In addition, depending on the CPU loads of the COWS and the respective CEWSs, selected classes of mobile units are temporarily denied the wireless communications service.

As can be appreciated from the foregoing, certain approaches to overload control may result in lost revenue to service providers due to dropping of low priority calls. However, service providers may choose to absorb the lost revenue because the duration of the increased demand or capacity overload is typically not long and the cost of purchasing higher capacity from an equipment provider exceeds the lost revenue over the long term. Moreover, changes in network capacity are typically implemented through an equipment/software provider's customer service organization. It may take two or three days before a capacity level changed through customer service actually becomes effective and then it usually remains effective until a subsequent change is processed.

Thus, there is motivation for a method of dynamically reconfiguring wireless network capacity based on current demand and overall capacity.

BRIEF SUMMARY OF INVENTION

In one aspect of the invention, a method for reconfiguring network capacity in a wireless network is provided. The method includes: a) determining if a current demand for network capacity exceeds a first value, b) if the current demand exceeds the first value, reconfiguring network capacity for the wireless network to a higher network capacity, c) determining if the current demand is less than a second value, and d) if the current demand is less than the second value, reconfiguring network capacity for the wireless network to the original purchased network capacity.

In another aspect of the invention, a method for dynamically reconfiguring network capacity in a wireless network is provided. The method includes: a) determining if a current demand for network capacity exceeds a first value, b) if the current demand exceeds the first value, reconfiguring network capacity for the wireless network to a higher network capacity, c) determining if the current demand is less than a second value, and d) if the current demand less than the second value, reconfiguring network capacity for the wireless network to a lower network capacity.

In still another aspect of the invention, a method for dynamically reconfiguring wireless network capacity purchased by a service provider from a network equipment/software provider is provided. The method includes: a) determining if a current demand for network capacity exceeds a first value, b) if the current demand exceeds the first value, determining if current purchased network capacity is a highest network capacity offered by a network equipment/software provider, c) if the current purchased network capacity is the highest network capacity offered, returning to step a), d) communicating usage data associated with the current purchased network capacity to the network equipment/software provider's billing system, reconfiguring network capacity for the wireless network to a higher purchased network capacity, and accumulating usage data at the higher purchased network capacity, e) determining if the current demand is less than a second value, f) if the current demand is less than the second value, determining if the current purchased network capacity is a lowest network capacity offered by the network equipment/software provider, g) if the current purchased network capacity is the lowest network capacity offered, returning to step a), h) reconfiguring network capacity for the wireless network to a lower purchased network capacity, communicating the usage data associated with the higher purchased network capacity to the network equipment/software provider's billing system, and accumulating usage data at the lower purchased network capacity, and i) periodically repeating steps a) through h) during operation of the wireless network.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
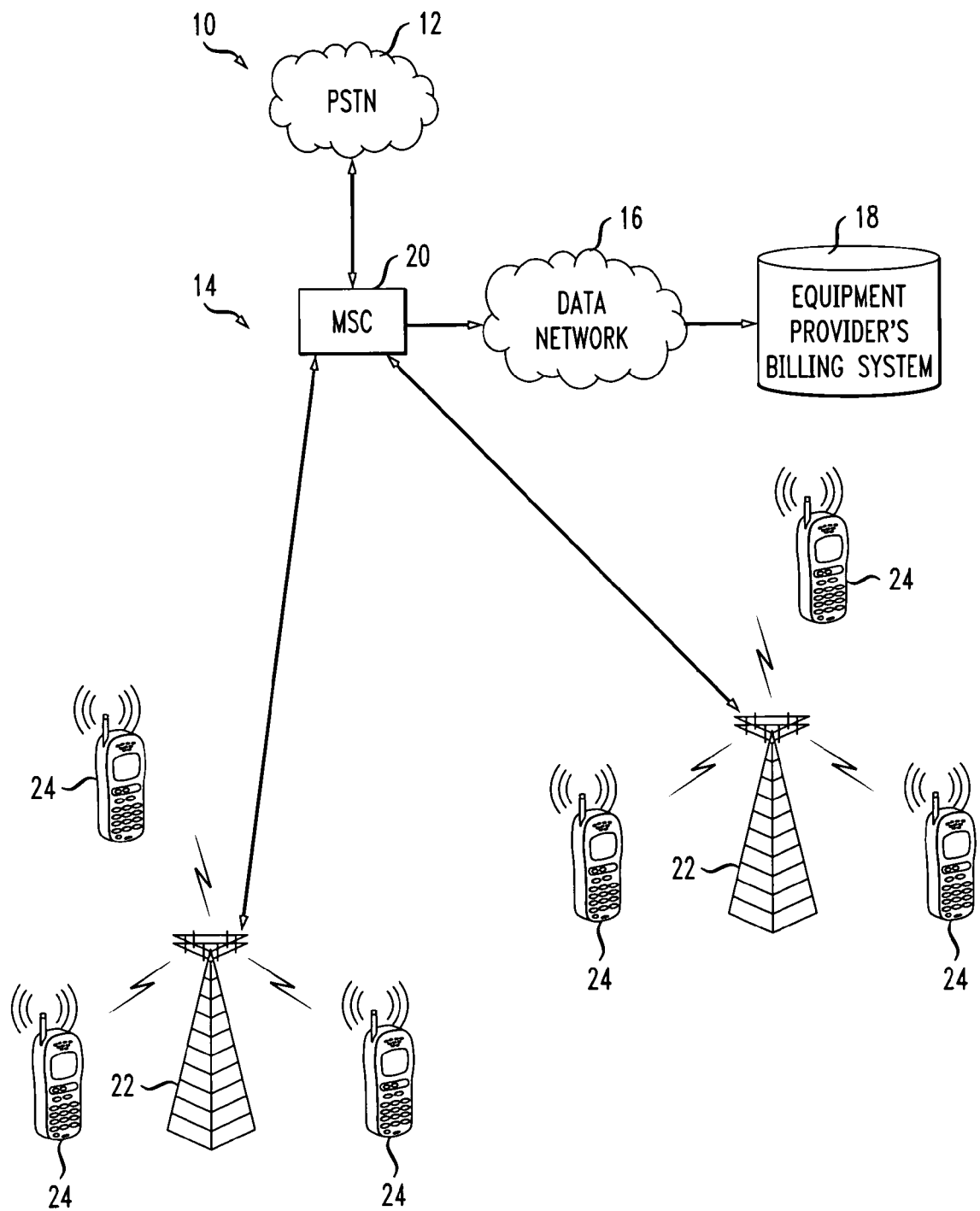
FIG. 1 is a block diagram of an embodiment of a telecommunications system incorporating at least one aspect of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, a telecommunication system 10 incorporating at least one aspect of the invention includes a public switched telephone network (PSTN) 12, a wireless network 14, a data network 16, and an equipment provider's billing system 18. The wireless network 14 includes one or more mobile switching centers (MSCs) 20, one or more base stations (BSs) 22 associated with each MSC 20, and one or more mobile stations (MSs) 24.

Network capacity for the wireless network is typically referred to in terms of busy hour call events. The wireless network 14 provides a methodology to dynamically switch network capacity for a given wireless service provider to a higher capacity level when a capacity higher than that originally purchased is needed. For example, when the network capacity is reaching an upper threshold of the originally purchased network capacity threshold in busy hours. Network capacity is a function of network equipment and/or software that is made available to a given wireless service provider by a network equipment/software provider. Preferably, the methodology to dynamically switch network capacity is included in the MSC. However, other components or peripherals associated with the MSC may provide the dynamic switching methodology and, in combination with the MSC, the various levels of network capacity.

Typically, the dynamic switching methodology is a feature that wireless service providers may activate or deactivate. When activated (i.e., turned on), the wireless network provides the wireless service provider with automatic network capacity reconfiguration functionality that is dynamically based on demand from wireless subscribers (i.e., MSs).

In one embodiment, the wireless network 14 is able to automatically switch an originally purchased network capacity level to a higher network capacity, if a higher network capacity is available (i.e., if the originally purchased network capacity is not the highest available network capacity), when the demand for network capacity is reaching an upper limit (i.e., upper threshold) of the originally purchased network capacity. For example, the originally purchased network capacity may be 500K busy hour call events, the upper threshold may be 450K busy hour call events or 90%, and the higher network capacity may be 1,000K busy hour call events. Furthermore, the highest network capacity may be 1,000K busy hour call events. Of course, other suitable levels of network capacity may be used in place of or in addition to these exemplary levels.

In another embodiment, the wireless network 14 is able to dynamically switch between any of two or more network capacity levels based on demand and current purchased network capacity. In this embodiment, it may be more effective for the network equipment/software provider to offer more levels of network capacity because dynamic switching based on demand can be implemented to optimize network capacity by reducing purchased system capacity during periods of low demand as well as increasing capacity during periods of high demand.

Currently, network equipment/software providers charge wireless service providers statically for each feature (e.g., via FAF or QFAF). The dynamic network capacity switching methodology also optionally enables the network equipment/software provider to integrate network capacity usage data with their billing system. Thus, the network capacity that the wireless service provider used will be charged dynamically based on usage data (i.e., network capacity levels and time associated with the network capacity levels). As shown in FIG. 1, the MSC 20 communicates the network capacity usage data to the equipment provider's billing system 18 via the data network 16.

In summary, the invention provides a methodology for the wireless network 14 to dynamically switch the original purchased system capacity to a higher capacity level when demand by subscribers associated with the wireless service provider is running near maximum capacity. When the demand for network capacity decreases to a predetermined level, the wireless network 14 dynamically switches the current purchased capacity level either back to the original purchased system capacity level or to an optimized network capacity level that is lower than the current level.

The methodology also optionally includes provisions for the wireless network 14 to monitor the duration for network capacity levels provided to the wireless service provider, including the duration of time at the higher capacity level, and accumulate such information as usage data. In this embodiment, the methodology integrates the accumulated usage data with the equipment provider's billing system 18 so that each billing cycle includes charges to wireless service providers for use of network capacity at each level provided.

Figure 2:
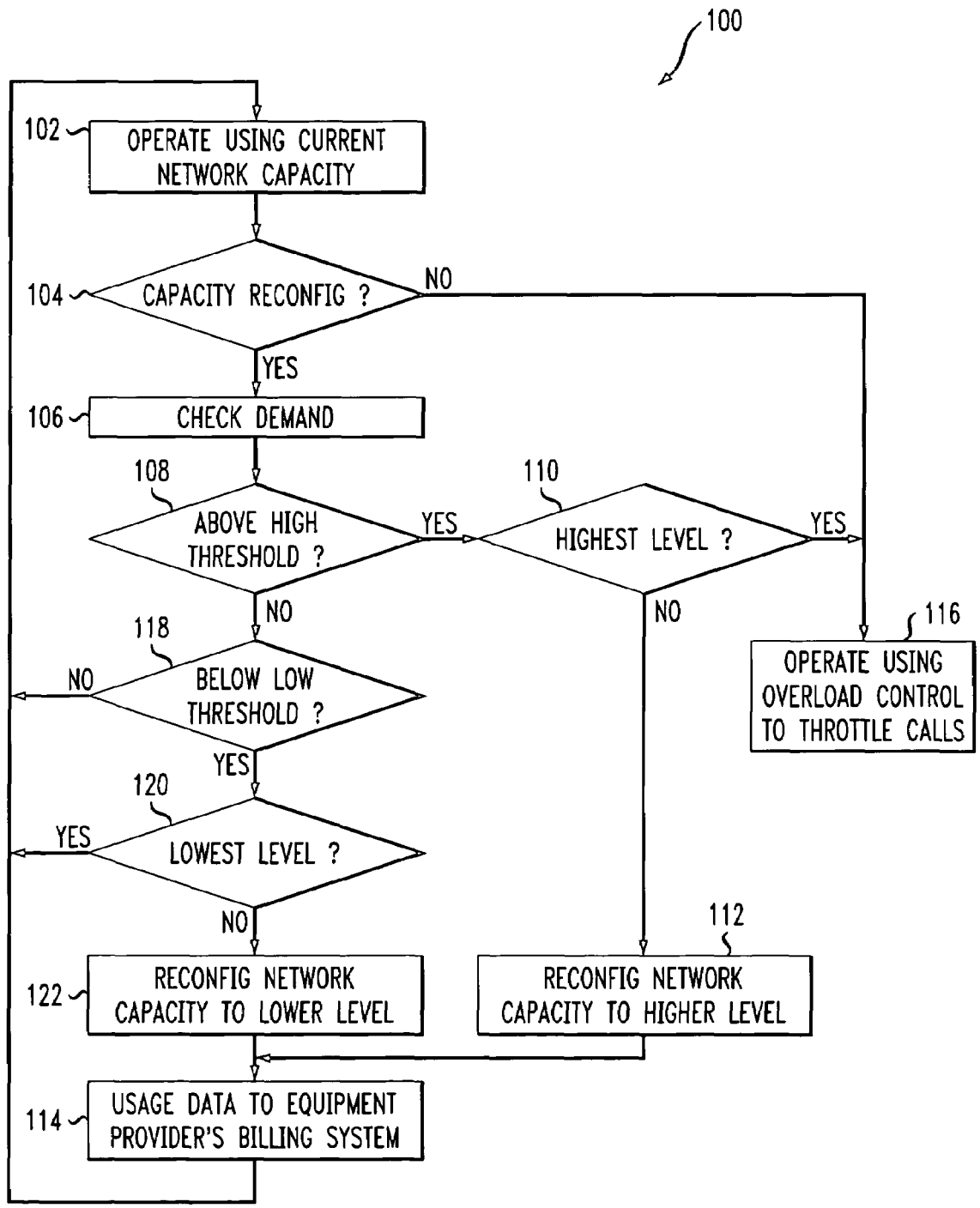
FIG. 2 is a flow chart of an embodiment of a method for dynamically reconfiguring wireless network capacity based on current demand and network capacity.

With reference to FIG. 2, a process 100 for dynamically reconfiguring wireless network capacity for a given wireless service provider begins at step 102 with a wireless network operating using a current network capacity. In other words, a wireless equipment/software provider is operating a wireless network and providing a wireless service provider with access to the network at a current network capacity. The current network capacity may be an originally purchased network capacity or a reconfigured network capacity.

Next, at step 104, the wireless network determines if the wireless service provider has activated a dynamic network capacity reconfiguration feature. If the wireless service provider has activated the feature, the wireless network checks the demand for network capacity associated with subscribers of the wireless service provider (step 106). At step 108, the wireless network determines whether the demand for network capacity exceeds a predetermined high threshold (e.g., a predetermined percentage of the current network capacity (0.90 or 90%)). If the current demand exceeds the predetermined high threshold, the wireless network determines if the current network capacity is at the highest capacity level offered by the network equipment/software provider (step 110).

If the current network capacity is not at the highest level offered, the wireless network dynamically reconfigures the network capacity for the wireless service provider to a higher purchased network capacity and begins accumulating usage data at the higher purchased network capacity (step 114). Usage data includes the network capacity level and the amount of time the wireless service provider is provided capacity at that level. Next, at step 114, any previous usage data accumulated for the lower network capacity is communicated to the network equipment/software provider's billing system and the process returns to step 102.

At step 104, if it is determined that the wireless service provider has not activated the dynamic network capacity reconfiguration feature, the wireless network uses an overload control function to throttle calls when the network capacity associated with the wireless service provider is experiencing an overload (step 116).

At step 110, if the current network capacity is at the highest level offered by the network equipment/software provider, the process returns to step 102 where the wireless network continues to provide the wireless service provider with the same network capacity. If an overload is experienced when the network capacity is at the highest level offered, the wireless network uses the overload control function to throttle calls.

At step 108, if the current demand does not exceed the predetermined high threshold, the wireless network determines whether the current demand is less than a predetermined low threshold (e.g., a predetermined percentage of current network capacity (0.7 or 70%)) (step 118). If the current demand is less than the predetermined low threshold, the wireless network determines if the current network capacity is at the lowest capacity level offered by the network equipment/software provider (step 120).

If the current network capacity is not at the lowest level offered, the wireless network dynamically reconfigures the network capacity for the wireless service provider to a lower purchased network capacity (e.g., the original purchased network capacity) and may begin accumulating usage data at the lower purchased network capacity (step 122). Next, at step 114, any previous usage data accumulated for the higher network capacity is communicated to the network equipment/software provider's billing system and the process returns to step 102.

At step 118, if the current demand is less than the predetermined low threshold, the process returns to step 102 where the wireless network continues to provide the wireless service provider with the same network capacity.

At step 120, if the current network capacity is at the lowest level offered by the network equipment/software provider, the process also returns to step 102 where the wireless network continues to provide the wireless service provider with the same network capacity.

In summary, steps 106-114 and 118-122 are only performed when the wireless service provider has activated the dynamic network capacity reconfiguration feature. When the demand for network capacity is reaching the upper limit or high threshold for the current purchased network capacity (e.g., 450K busy hour call events if the current network capacity is 500K or 90% of the current capacity), the wireless network automatically and dynamically increases the supported network capacity level for the wireless service provider to a higher level (e.g., 1,000K busy hour call events), if it is available. The wireless network continues running while monitoring the network capacity periodically. If the demand for network capacity becomes lower, for example, operating at 70% of originally or previously purchased capacity (e.g., 350K busy hour call events if the original or previous capacity was 500K), the wireless network automatically and dynamically reduces the supported network capacity level for the wireless service provider to a lower level (e.g., back to the original or previous capacity, for example, 500K busy hour call events).

Moreover, the wireless network integrates the network capacity level and the duration that the wireless service provider was running at that level of capacity and sends the resulting usage data to the network equipment/software provider's billing system for subsequent billing of the wireless service provider for system capacity. For example, time at increased network capacity is added to the wireless service provider's bill in addition to any originally purchased network capacity.

Wireless service providers are continually seeking ways to increase revenue. One way is to quickly increase the network capacity that the wireless service provider purchased to a higher network capacity for some period of time, e.g., busy hours, enabling the wireless service provider to provide additional services and presumably collect additional revenue. Dynamically increasing network capacity will also potentially increase revenue for network equipment/software providers providing the dynamic reconfiguration feature to wireless service providers by being able to track and bill the wireless service providers for the increased network capacity.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for dynamically reconfiguring wireless network capacity purchased by a service provider from a network equipment/software provider, the method including the steps:
   a) determining if a current demand for network capacity exceeds a first value;
   b) if the current demand exceeds the first value, determining if current purchased network capacity is a highest network capacity offered by a network equipment/software provider;
   c) if the current purchased network capacity is the highest network capacity offered, returning to step a);
   d) communicating usage data associated with the current purchased network capacity to the network equipment/software provider's billing system, reconfiguring network capacity for the wireless network to a higher purchased network capacity, and accumulating usage data at the higher purchased network capacity;
   e) determining if the current demand is less than a second value;
   f) if the current demand is less than the second value, determining if the current purchased network capacity is a lowest network capacity offered by the network equipment/software provider;
   g) if the current purchased network capacity is the lowest network capacity offered, returning to step a);
   h) reconfiguring network capacity for the wireless network to a lower purchased network capacity, communicating the usage data associated with the higher purchased network capacity to the network equipment/software provider's billing system, and accumulating usage data at the lower purchased network capacity; and
   i) periodically repeating steps a) through h) during operation of the wireless network.

2. The method as set forth in claim 1 wherein the highest network capacity offered by the network equipment/software provider is 1,000K busy hour call events.

3. The method as set forth in claim 2 wherein the lowest network capacity offered by the network equipment/software provider is 500K busy hour call events.

* * * * *